United States Patent [19]

Yukita et al.

[11] Patent Number: 5,705,292
[45] Date of Patent: Jan. 6, 1998

[54] LITHIUM ION SECONDARY BATTERY

[75] Inventors: Yasuo Yukita; Nobuhiro Fujiwara, both of Kanagawa; Yukio Noda, Tokyo; Kazuya Kojima, Kanagawa, all of Japan

[73] Assignee: Sony Corporation, Tokyo, Japan

[21] Appl. No.: 666,688

[22] Filed: Jun. 18, 1996

[30] Foreign Application Priority Data

Jun. 19, 1995 [JP] Japan .................................. 7-151792
Sep. 27, 1995 [JP] Japan .................................. 7-249926

[51] Int. Cl.$^6$ ................................................ H01M 2/16
[52] U.S. Cl. ........................ 429/137; 429/144; 429/162; 29/623.3; 29/623.5
[58] Field of Search ................................. 429/137, 144, 429/162, 246; 29/623.3, 623.5

[56] References Cited

U.S. PATENT DOCUMENTS

4,882,828  11/1989  McLoughlin et al. .................. 429/137
4,964,877  10/1990  Keister et al. ...................... 429/137 X
5,128,220   7/1992  O'Hara et al. ...................... 429/144 X
5,342,709   8/1994  Yahnke et al. ........................ 429/162

*Primary Examiner*—Stephen Kalafut
*Attorney, Agent, or Firm*—Hill, Steadman & Simpson

[57] ABSTRACT

A lithium ion secondary battery according to the present invention includes a positive electrode, a negative electrode, a separator, and a heat-resistant and heat-insulating film having pores. The heat-resistant and heat-insulating film is formed on at least one of surfaces opposed to each other of the positive and negative electrodes. The positive electrode and the negative electrodes are laminated through the separator. The heat-resistant and heat-insulating film contains metal oxide, metal carbonate or metal nitride. The heat-resistant and heat-insulating film is formed by spraying powders of metal oxide, metal carbonate or metal nitride. The spraying is plasma spraying. A surface where the positive electrode and the negative electrode are not opposed to each other is provided. On at least one of surfaces forming the interface, the heat-resistant and heat-insulating film is formed by spraying powders of metal oxide, metal nitride or the like.

23 Claims, 7 Drawing Sheets

LITHIUM ION SECONDARY BATTERY

BACKGROUND OF THE INVENTION

1. Field of the Invention

The present invention relates to a large-capacity lithium ion secondary battery which is utilized as a power source for various electronic equipments and which is suitable for use in an uninterruptible power system (UPS), a load leveling and so on.

2. Description of the Related Art

A small-size secondary battery has been widely used as a power source for a portable electronic equipment in fields of an office automation equipment, a factory automation equipment, a household electric equipment, a communication equipment and so on. Therefore, when being applied to such equipments, the small-size secondary battery is required to have a satisfactory volumetric efficiency, a small size and a light weight. On the other hand, a large-size secondary battery has been studied and developed not only in the fields of the load leveling and the UPS but also in many fields relating to environmental problems. In such fields, the large-size lithium ion secondary battery is required to have a large capacity, a large output, a high voltage, and an excellent long-term preservation.

When the lithium ion secondary battery is charged, lithium is eluted as lithium ion from an active material of a positive electrode into an electrolysis solution in a separator and then the lithium ion enters an active material of a negative electrode. When the lithium ion secondary battery is discharged, the lithium ion entered, in the active material of the negative electrode is eluted into the electrolysis solution and then returns into the active material of the positive electrode. Thus, the lithium ion secondary battery is charged and discharged.

In order to increase an energy density, most of the small-size lithium ion secondary batteries have rectangular structures or cylindrical structures. Active materials are coated on both surfaces of metal foil collectors to form sheet-like positive and negative electrodes. A large number of pairs of electrodes each having a predetermined size are successively laminated through separators formed of microporous polyolefin resin films made of polyethylene or polypropylene. Thus, the rectangular battery is formed. The cylindrical battery is formed by winding the long rectangular positive and negative electrodes through the separators.

The small-size lithium ion secondary battery employs a separator formed of a microporous polyolefin resin film. The separator melts at a high temperature (100° C. to 160° C.) and its micropores are shut down to suppress conduction of ion. Therefore, even if the battery is externally short-circuited or internally short-circuited, it is possible to prevent a large amount of heat and gas from being generated because of an increased temperature of the battery.

When a large-capacity lithium ion secondary battery is arranged by successively laminating the positive and negative electrodes having collectors coated with active materials similarly to the above small-size lithium ion secondary battery, if the large-capacity lithium ion secondary battery is internally short-circuited, there can be then the following problem because of the large capacity thereof. Heat is generated at the position of the internal short circuit. A separator disposed between the positive and negative electrodes adjacent to the position melts, which enlarges a scale of the internal short circuit. As a result, a large amount of heat is applied to the surroundings and a large amount of gas gushes.

A nail piercing test is carried out as a simulation test for artificial short-circuit between the positive and negative electrodes by piecing a nail into the battery from the outside thereof. The inventor of the present intention found the following point. In the above process in which a large amount of gas gushes from the above large-capacity lithium ion secondary battery when a nail is pieced thereinto, heat is first generated by resistance at a nail-pieced portion of the battery and melts a separator between the positive and negative electrodes adjacent thereto, which causes a direct reaction between the positive and negative electrodes to generate heat. Further, the newly generated heat melts a separator between the positive and negative electrodes adjacent to the position of the direct reaction. Thereafter, heat is successively generated similarly, which leads to direct reaction between the entire positive and negative electrodes and also to generation of a large amount of heat. As a result, the separator formed of the microporous polyolefin resin film formed between the positive and negative electrodes opposed to each other is heated to the temperature or higher at which its micropores are shut down, and then the separator completely melts and becomes pyrolyzed. The positive and negative electrodes are directly short-circuited, which enlarges a scale of the internal short circuit. Finally, a large amount of heat is applied to the surroundings and a large amount of gas gushes.

SUMMARY OF THE INVENTION

In view of such aspects, it is an object of the present invention to prevent an internal short circuit of a large-capacity lithium ion secondary battery from spreading to an adjacent portion between positive and negative electrodes, to prevent a direct short circuit between the positive and negative electrodes, and to suppress to a minimum such a disadvantage that the battery itself is damaged and an influence of the internal short circuit spreads to the surroundings when the internal short circuit is enlarged.

According to a first aspect of the present invention, a lithium ion secondary battery according to the present invention includes a positive electrode, a negative electrode, a separator, and a heat-resistant and heat-insulating film having pores. The heat-resistant and heat-insulating film is formed on at least one of surfaces opposed to each other of the positive and negative electrodes. The positive electrode and the negative electrodes are laminated through the separator. The heat-resistant and heat-insulating film contains metal oxide, metal carbonate or metal nitride. The heat-resistant and heat-insulating film is formed by spraying powders of metal oxide, metal carbonate or metal nitride. The spraying is plasma spraying.

According to a second aspect of the present invention, the lithium ion secondary battery according to the present invention includes the positive electrode, the negative electrode, the separator, and the heat-resistant and heat-insulating film. The heat-resistant and heat-insulating film is formed on at least one surface of surfaces, which are not opposed to each other, of the positive and negative electrodes. The positive electrode and the negative electrode are laminated through the separator. The heat-resistant and heat-insulating film contains metal oxide, metal carbonate or metal nitride. A second heat-resistant and heat-insulating film is formed on at least one of surfaces opposed to each other of the positive and negative electrodes. The heat-resistant and heat-insulating film is formed by spraying powders of metal oxide, metal carbonate or metal nitride. The spraying is plasma spraying. The second heat-resistant and heat-insulating film is formed on at least one of surfaces opposed to each other of the positive and negative electrodes, by spaying powders of metal oxide, metal carbonate or metal nitride.

DESCRIPTION OF THE PREFERRED EMBODIMENTS

A lithium ion secondary battery according to the present invention will hereinafter be described with reference to the accompanying drawings.

A first embodiment of the present invention will be described with reference to FIGS. 1 to 3.

Figure 1A:
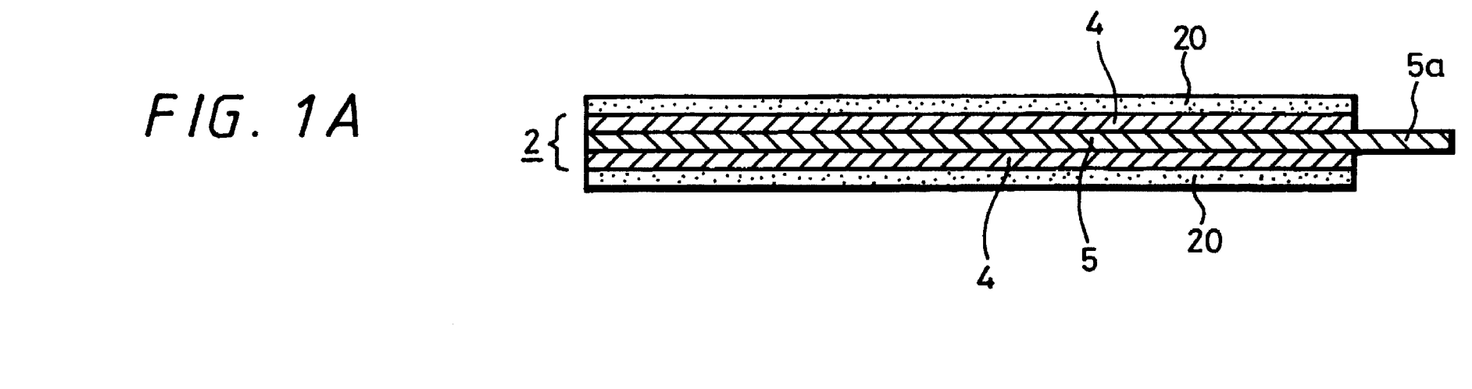
FIGS. 1A and 1B are cross-sectional views respectively showing arrangements of a positive electrode and a negative electrode used in a lithium ion secondary battery according to the present invention.
Figure 1B:
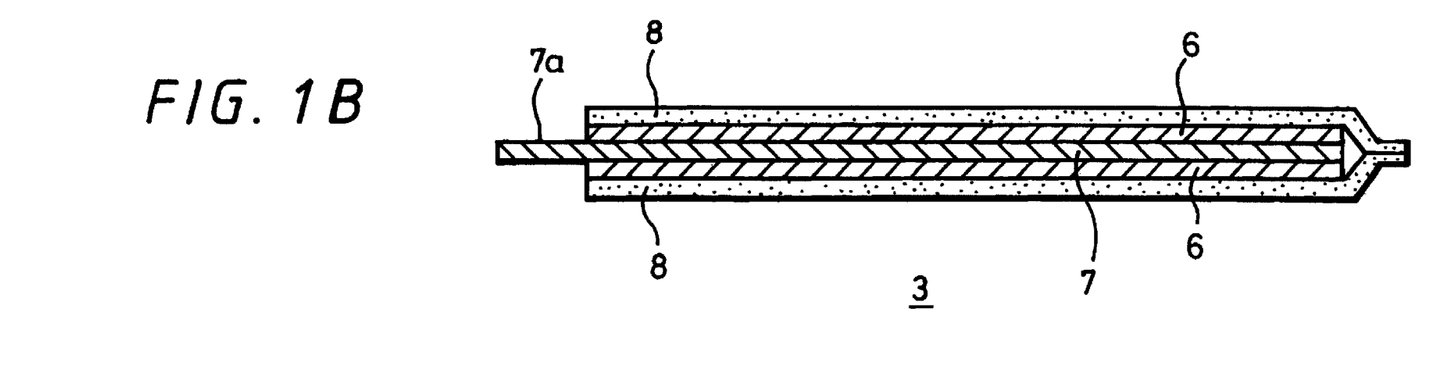
Figure 2:
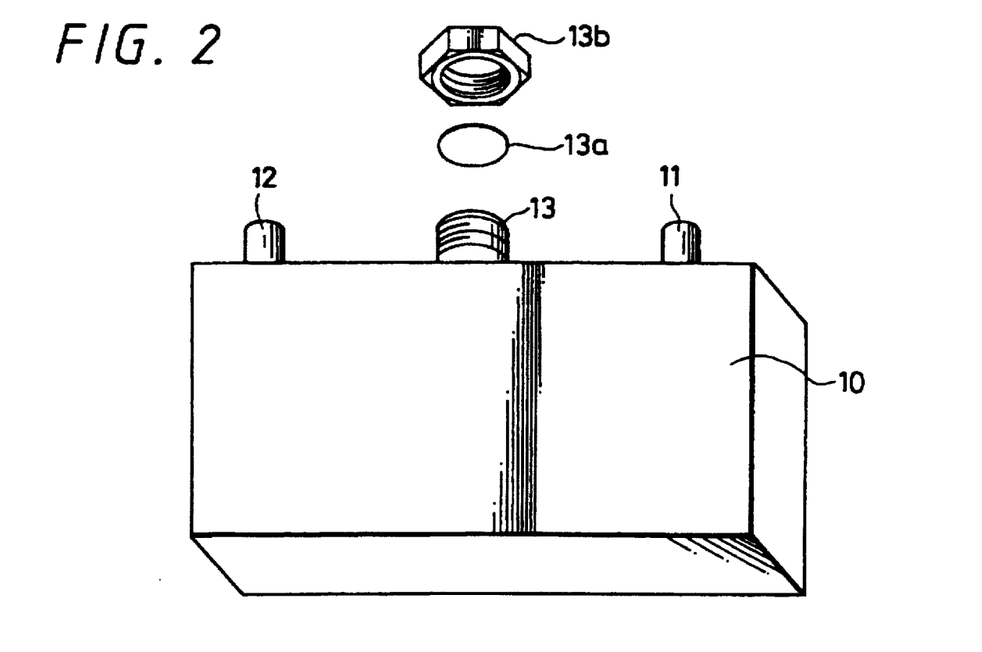
FIG. 2 is a perspective view showing an embodiment of the lithium ion secondary battery according to the present invention.

In FIG. 2, reference numeral 10 depicts a closed-type flat, rectangular battery case formed of a stainless plate and having a predetermined shape. A laminated body 14 shown in FIG. 3 and formed by alternately laminating thirty sheet-like positive electrodes 2 and thirty-one sheet-like negative electrodes 3 through separators 8 shown in FIGS. 1A and 1B is housed in the flat, rectangular battery case 10.

The sheet-like positive electrode 2 used in the first embodiment was manufactured as follows.

Lithium carbonate and cobalt carbonate were mixed in a molar ratio of Li/Co=1. The mixture was burned in the air at 900° C. for five hours to synthesize a positive-electrode active material made of $LiCoO_2$. The positive-electrode active material was crushed by an auto mortar to obtain a powder of $LiCoO_2$.

The $LiCoO_2$ powder of 95 weight % thus obtained and lithium carbonate of 5 weight % were mixed to obtain a mixture. The mixture of 91 weight %, graphite of 6 weight % as a conductive material, and poly(vinylidene fluoride) of 3 weight % as a binder were mixed to manufacture the positive-electrode mixture. The positive-electrode mixture was dispersed in N-methyl-2-pyrrolidone and slurried.

The slurried positive-electrode mixture was coated on both surfaces of a stripe aluminum foil which is a positive-electrode collector, and then dried. Thereafter, the positive-electrode collector with the dried slurried positive-electrode mixture was compression-molded by a roller pressing machine to manufacture the positive-electrode original sheet having a positive-electrode collector 5 and positive-electrode mixtures 4 deposited on both surfaces of the positive-electrode collector 5 as shown in FIG. 1A.

As shown in FIG. 1A, the positive-electrode original sheet was punched to obtain a sheet of positive-electrode 2 having a size of 107 mm×265 mm.

In the first embodiment, as shown in FIG. 1A, a sprayed film, i.e., a heat-resistant and heat-insulating film 20 is formed by spraying, e.g. plasma-spraying a ceramic powder of alumina ($Al_2O_3$) having a mean particle size of 20 μm on both surfaces of the positive-electrode mixtures 4 deposited on the positive electrode 2.

Such heat-resistant and heat-insulating film 20 has a combined structure of the sprayed particles which is similar to a structure of a porous sintered body having combined pores. When the heat-resistant and heat-insulating film 20 had a thickness of about 30 μm, its porosity ranged from 10 to 20%.

Spraying is a technique of heating a spray material such as metal, metal oxide or the like by using a heat source such as the burning of a fuel and oxygen, an electric energy or the like to spray particles of the heated spray material in their molten state or a state close thereto to a base for forming a film. The spraying can roughly divided into two systems, i.e., a gas spraying and an electric spraying.

The gas spraying includes a flame spraying and a detonation spraying. The electric spraying includes an electric arc spraying, a plasma spraying and a linear detonation spraying. Among these spraying systems, the plasma spraying system employs a very high temperature plasma jet. Therefore, the plasma spraying facilitates the spraying of a high melting-point material, such as ceramic, cermet or the like, which is hardly sprayed by gas spraying.

The plasma spraying system is formed of a spraying gun, a spray-material supply apparatus, a power source, a high-frequency stator, a cooling-water supply pump, and a control apparatus. Particles with their particle sizes of several tens of μm molten by the plasma jet (10000° C. to 20000° C.) collide with the base at high speed. The particles are cooled within a very short time (in an order of 10 msec), thereby changing their phases from their liquid phases to their solid phases. Such particles in their solid phases are laminated on the base to form the film.

Accordingly, the sprayed film has a structure similar to that of the porous sintered body (having a porosity ranging from about 0 to 20%) having micropores formed by combining the sprayed particles. As a result, it is possible to obtain a film having an ion permeability and resistance to heat higher than 1000° C.

Various materials such as metal, metal oxide, metal carbonate, metal nitride or the like can be used as a spray material. Ceramic powders of metal oxide such as alumina ($Al_2O_3$), zirconia ($ZrO_2$), alumina zirconia ($Al_2O_3$-$ZrO_2$), magnesium zirconate ($MgZrO_2$) or the like are suitable, in terms of electrochemistry, for use as a battery material particularly having resistance to heat higher than 500° C., thermal insulation at least up to 500° C., and electrical insulation.

In the first embodiment, the sheet-like negative electrode 3 was manufactured as follows.

After a functional group containing oxygen was introduced to petroleum pitch which was a starting material (petroleum pitch was subjected to a so-called oxide bridge), the petroleum pitch was burned at 1000° C. in an inert gas to obtain a non-graphitizable carbon material having a property close to that of glassy carbon.

This carbon material (negative-electrode active material) of 90 weight % and poly(vinylidene fluoride) of 10 weight % as a binder were mixed to manufacture a negative-electrode mixture. The negative-electrode mixture was dispersed in N-methyl-2-pyrrolidone and slurried.

The slurried negative-electrode mixture was coated on both sides of a stripe copper foil which is a negative-electrode collector 7, and dried. Thereafter, the negative-electrode mixture was compression-molded by a roller pressing machine to manufacture a negative-electrode original sheet having the negative-electrode collector 7 and the negative-electrode mixture 6 deposited on both surfaces of the negative-electrode collector 7 as shown in FIG. 1B.

The negative-electrode original sheet was punched to obtain one sheet of negative electrode 3 having a size of 109 mm×270 mm as shown in FIG. 1B.

In the first embodiment, as shown in FIG. 1B, the negative electrode 3 is inserted into a bag-like separator formed by bonding two separators 8 formed of porous polypropylene film to each other.

The thirty positive electrodes 2 each having the heat-resistant and heat-insulating films 20 deposited on both of their surfaces and the thirty-one negative electrodes 3 each inserted into the bag-like separator 8 were alternately laminated so that edge portions 5a, where the positive-electrode mixture 4 was not deposited, of the positive-electrode collectors 5 were disposed on the same side and that edge portions 7a, where the negative-electrode mixture 6 was not deposited, of the negative-electrode collectors 7 were disposed on the same side which is the opposite side of the end portions 5a. Thus, a laminated body 14 was formed.

Figure 3:
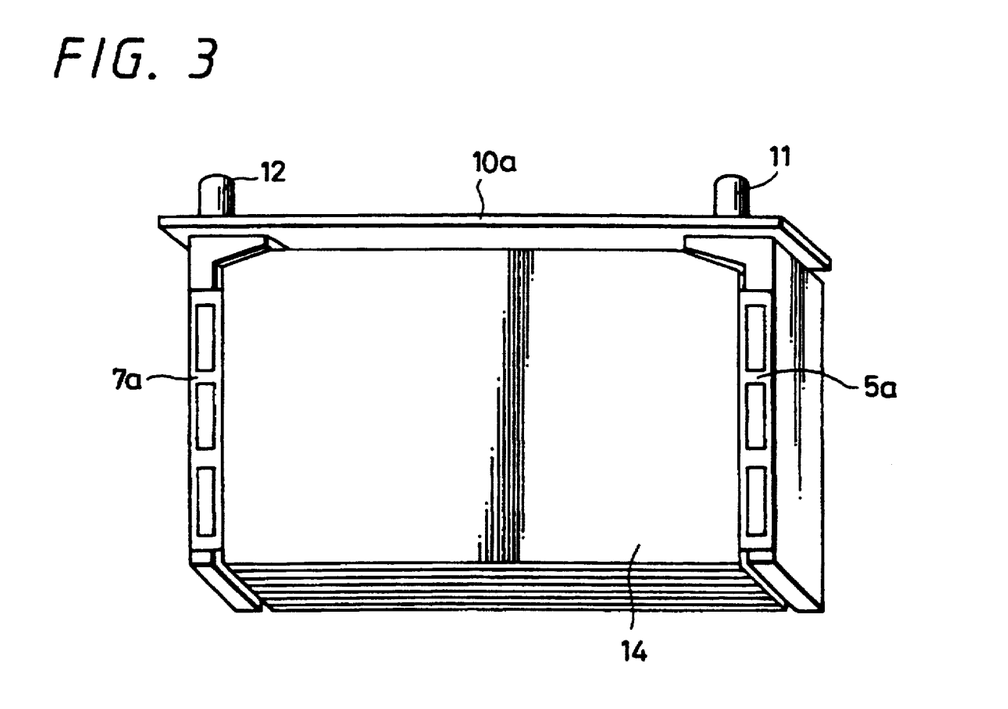
FIG. 3 is a perspective view used to explain the embodiment of the lithium ion secondary battery shown in FIG. 2.

As shown in FIG. 3, the edge portions 5a of the positive-electrode collectors 5 of the laminated body 14 were welded to a positive-electrode terminal 11 by ultrasonic welding, and the edge portions 7a of the negative-electrode collectors 7 of the laminated body 14 were welded to a negative-electrode terminal 12 by ultrasonic welding.

The laminated body 14 shown in FIG. 3 provided with the positive-electrode terminal 11 and the negative-electrode terminal 12 is inserted into the flat, rectangular battery case 10. A lid plate 10a made of stainless steel and having an electrolysis-solution inlet 13 is welded to the flat, rectangular battery case 10 by laser welding to close the flat, angular battery case 10.

Thereafter, LiPF$_6$ is dissolved in a mixed solvent of propylene carbonate and diethyl carbonate in a ratio of 1 mol/l to prepare an organic electrolysis solution. The organic electrolysis solution is poured into the flat, rectangular battery case 10 from the electrolysis-solution inlet 13 and filled between the positive-electrode mixture 4 and the negative-electrode mixture 6.

A burst plate 13a formed of a stainless foil with a thickness of 5 μm, for example, as a safety valve is fixed on the electrolysis-solution inlet 13 by a burst-plate holder 13b so as to seal the electrolysis-solution inlet 13.

When the first embodiment of the lithium ion secondary battery according to the present invention was charged and discharged, the result showed a discharge capacity of 35 Ah and satisfactory charge and discharge characteristics.

After being fully charged by a charge voltage of 4.2 V, the lithium ion secondary battery according to the first embodiment was subjected to the nail piercing test. Study of results of the test shown in the following Table 1 reveal that gas hardly gushed from the battery, a reduced amount of the electrolysis solution, i.e., a reduced weight thereof was small (i.e., 25.8 g), and hence safety with respect to the internal short circuit was improved.

TABLE 1

| | shape | heat-resistant and heat-insulating material (spray material) | reduced weight |
|---|---|---|---|
| first embodiment | rectangular | alumina (on both surfaces of positive-electrode collector) | 25.8 g |
| second embodiment | rectangular | alumina zirconia (on both surfaces of negative-electrode collector) | 29.6 g |
| third embodiment | cylindrical | alumina (on both surfaces of positive-electrode collector) | 32.5 g |
| comparative example 1 | rectangular | none | 446.1 g |
| comparative example 2 | cylindrical | none | 319.7 g |

1) In each of the lithium ion secondary battery according to the first to third embodiments and the comparative examples 1 and 2, the positive-electrode mixture is coated on both of the surface of the positive-electrode collector 5, and the negative-electrode mixture is coated on both of the surfaces of the negative-electrode collector 7.

Specifically, according to the first embodiment, even if the battery is internally short-circuited and resultant thermal fusion and thermal decomposition of the separator 8 lead to contact between the positive electrode 2 and the negative electrode 3, the heat-resistant and heat-insulating film 20 having pores and formed by spraying the alumina ceramic powders by plasma spraying on both of the surfaces of the positive electrode 2 opposing to the respective negative electrodes 3, secures the electrical insulation between the positive and negative electrodes 2 and 3 and prevents the direct short circuit therebetween, which suppresses generation of a large amount of heat and gush of gas resulting from the enlarged scale of the short circuit.

Since the heat-resistant and heat-insulating film 20 formed by spraying according to the first embodiment has micropores, the lithium ion can pass through the pores, which maintains the normal charge and discharge functions thereof.

A second embodiment of the lithium ion secondary battery shown in Table 1 will be described. In the second embodiment, the negative electrode 3 was formed similarly to that of the first embodiment. Ceramic powders of alumina zirconia ($Al_2O_3$-$ZrO_2$) having a mean particle size of 18 μm were sprayed by plasma spraying on both of surfaces of the negative electrode 3 to form the sprayed films, i.e., heat-resistant and heat-insulating films on the negative mixtures 6 of the negative electrode 3.

The positive electrode 2 was formed similarly to that of the first embodiment, but the heat-resistant and heat-insulating film 20 was not formed on either of the surfaces of the positive electrode 2. The positive electrode 2 is inserted into a bag-like separator formed by bonding the polypropylene porous film separators 8 to each other.

In the second embodiment, the thirty-one negative electrodes 3 each having the heat-resistant and heat-insulating films formed on both of the surfaces thereof and the thirty positive electrodes 2 each inserted into the bag-like separator 8 are alternately and successively laminated to form the laminated body 14. Other arrangements in the second embodiment are similar to those of the first embodiment.

When the lithium ion secondary battery according to the second embodiment was charged and discharged, the result showed a discharge capacity of 35 Ah and satisfactory charge and discharge characteristics.

After being fully charged by a charge voltage of 4.2 V, the lithium ion secondary battery according to the second embodiment was subjected to the nail piercing test. Study of results of the test shown in the above Table 1 reveal that gas hardly gushed from the battery, a reduced amount of the electrolysis solution, i.e., a reduced weight thereof was small (i.e., 29.6 g), and hence safety with respect to the short circuit was improved.

Accordingly, it can easily be understood that the same effects as those of the first embodiment can be achieved by the second embodiment.

Figure 4:
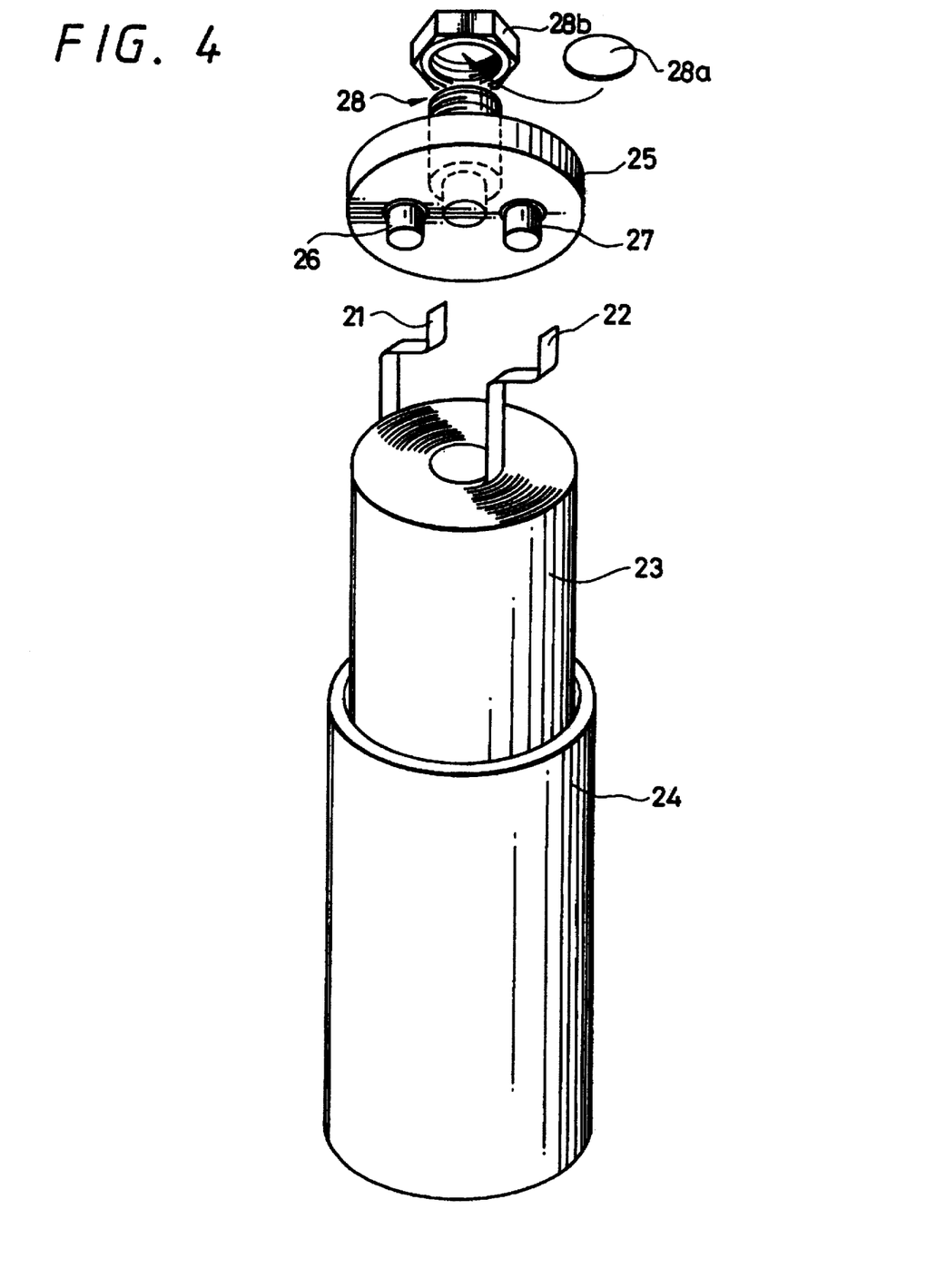
FIG. 4 is an exploded, perspective view showing a third embodiment of the lithium ion secondary battery according to the present invention.

The third embodiment of a lithium ion secondary battery shown in Table 1 is a cylindrical large-capacity lithium ion secondary battery shown in FIG. 4. In the third embodiment, a stripe negative electrode 3 (having a size of 283 mm×1750 mm) having negative-electrode mixtures 6 coated on both surfaces of a negative-electrode collector 7 similarly to that of the first embodiment was manufactured, and a stripe positive electrode 2 (having a size of 280 mm×1745 mm) having the positive-electrode mixtures 4 coated on both surfaces of a positive-electrode collector 5 similarly to that of the first embodiment was manufactured. See FIGS. 5A and 5B.

One end of a negative-electrode lead 21 made of nickel was welded by resistance welding to a lead portion provided on one side of the negative electrode 3. One end of a positive-electrode lead 22 made of aluminum is welded by resistance welding to a lead portion provided on the other side of the positive electrode 2.

A sprayed film, i.e., a heat-resistant and heat-insulating film 20 having a thickness of 30 μm was formed by plasma-spraying a ceramic powder of alumina ($Al_2O_3$) having a mean particle size of 18 μm on both of the surfaces of the positive electrode 2.

In the third embodiment, the negative electrode 3, a polypropylene microporous film separator 8 having a thickness of 25 μm and a size of 287 mm×1755 mm, the positive electrode 2, and the separator 8 were successively laminated and then spirally wound plural times to form a spirally laminated body 23.

In this case, the spirally laminated body 23 is arranged such that the heat-resistant and heat-insulating film 20 made of alumina having a thickness of 30 μm is located between the positive electrode 2 and the negative electrode 3.

An insulating plate was inserted into a nickel-plated cylindrical battery case 24 made of iron and located on a bottom thereof. Thereafter, the spirally laminated body 23 was housed in the cylindrical battery case 24. The other end of the negative-electrode lead 21 was welded to a negative-electrode terminal 26 of a nickel-plated iron battery lid 25 having the negative-electrode terminal 26, a positive-electrode terminal 27 and an electrolysis-solution inlet 28, and the other end of the positive-electrode lead 22 was welded to the positive-electrode terminal 27 thereof.

$LiPF_6$ was dissolved in a mixed solvent of propylene carbonate of 50 weight % and diethyl carbonate of 50 weight % in a ratio of 1 mol/l to prepare an organic electrolysis solution. The organic electrolysis solution was poured into the cylindrical battery case 24 from the electrolysis-solution inlet 28 and filled between the positive-electrode mixture 4 and the negative-electrode mixture 6.

A stainless foil burst plate 28a as a safety valve having a thickness of 5 μm, for example, was fixed on the electrolysis-solution inlet 28 by a burst-plate holder 28b so as to seal the electrolysis-solution inlet 28. The battery lid 25 and the cylindrical battery case 24 were fixed on each other by laser welding to manufacture the cylindrical lithium ion secondary battery having a diameter of 50 mm and a height of 300.5 mm.

When the cylindrical lithium ion secondary battery according to the third embodiment was charged and discharged, the result showed a discharge capacity of 20 Ah and satisfactory charge and discharge characteristics.

After being fully charged by a charge voltage of 4.2 V, the lithium ion secondary battery according to the third embodiment was subjected to the nail piercing test. Study of results of the test shown in the above Table 1 reveal that gas hardly gushed from the battery, a reduced amount of the electrolysis solution, i.e., a reduced weight thereof was small (i.e., 32.5 g), and hence safety with respect to the short circuit was improved.

Accordingly, it can easily be understood that the same effects as those of the first embodiment can be achieved in the third embodiment.

A comparative example 1 of the lithium ion secondary battery shown in Table 1 is arranged similarly to the lithium ion secondary battery according to the first embodiment, except that the lithium ion secondary battery according to the comparative example 1 does not have a sprayed film, i.e., a heat-resistant and heat-insulating film 20 formed on either of surfaces of a positive electrode 2. The lithium ion secondary battery according to the comparative example 1 had a discharge capacity of 35 Ah.

After being fully charged by a charge voltage of 4.2 V, the lithium ion secondary battery according to the comparative example 1 was subjected to the nail piercing test. Study of results of the test shown in the above Table 1 reveal that a large amount of gas gushed from the battery and that a reduced amount of the electrolysis solution, i.e., a reduced weight thereof was large (i.e., 446.1 g).

A comparative example 2 of a lithium ion secondary battery shown in Table 1 is arranged similarly to the lithium ion secondary battery according to the third embodiment, except that the lithium ion secondary battery according to the comparative example 2 does not have a sprayed film, i.e., a heat-resistant and heat-insulating film 20 formed on either of surfaces of a stripe positive electrode 2. The lithium ion secondary battery according to the comparative example 2 had a discharge capacity of 20 Ah.

After being fully charged by a charge voltage of 4.2 V, the lithium ion secondary battery according to the comparative example 2 was subjected to the nail piercing test. Study of results of the test shown in the above Table 1 reveal that a large amount of gas gushed from the battery and that a reduced amount of the electrolysis solution, i.e., a reduced weight thereof was large (i.e., 319.7 g).

While in the first to third embodiments either of the positive electrode 2 or the negative electrode 3 has the heat-resistant and heat-insulating films 20 formed on both of the surfaces thereof, it is needless to say that each of the positive electrode 2 and the negative electrode 3 may have the heat-resistant and heat-insulating films 20 formed on both of the surfaces thereof. While in the first to third embodiments alumina or alumina zirconia is employed as the spray material, other materials such as metal oxide, metal carbonate, metal nitride or the like may be employed.

According to the first to third embodiments of the lithium ion secondary batteries of the present invention, since each of the lithium ion secondary batteries has the heat-resistant and heat-insulating film 20 formed between the positive electrode 2 and the negative electrode 3, even if the battery is internally short-circuited and the separator 8 is thermally fused and pyrolyzed to bring the positive electrode 2 and the negative electrode 3 in the direct contact with each other, then it is possible to reliably keep the electrical insulation between the positive and negative electrodes 2 and 3, to prevent the direct short circuit between the positive and negative electrodes 2 and 3, and to suppress a large amount of heat generated by an enlarged scale of the short circuit and a large amount of gushing gas caused thereby.

Since the heat-resistant and heat-insulating film according to the first to third embodiments has the micropores, the lithium ion can be passed through the micropores, which secures the normal charge and discharge function of the battery.

Other embodiments of the lithium ion secondary battery according to the present invention will hereinafter be described with reference to FIGS. 5 to 8. While a positive-electrode mixture is coated on both surfaces of a positive-electrode collector in the first to third embodiments, the positive-electrode mixture is coated only on one surface of the positive-electrode collector in the following embodiments of the present invention.

Figure 5A:
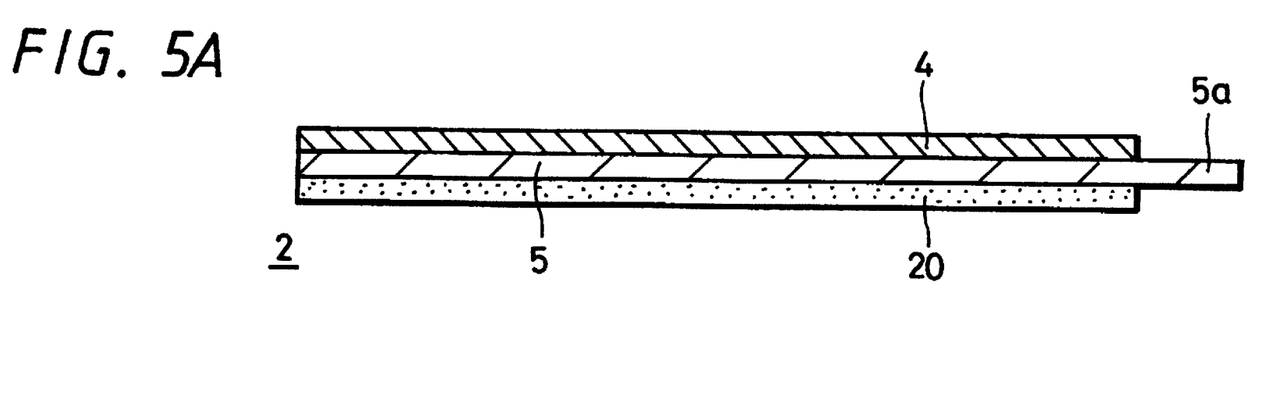
FIGS. 5A and 5B are cross-sectional views respectively showing arrangements of a positive electrode and a negative electrode usable in the lithium ion secondary battery according to the present invention.

In the fourth embodiment of the present invention, a sheet-like positive electrode 2 is arranged similarly to that of the first embodiment, except that, as shown in FIG. 5A, a positive-electrode mixture 4 is coated only on one surface of a positive-electrode collector 5 and a heat-resistant and heat-insulating film 20 is formed on the other surface thereof.

In the fourth embodiment, a negative electrode 3 is arranged similarly to that of the first embodiment.

Figure 5B:
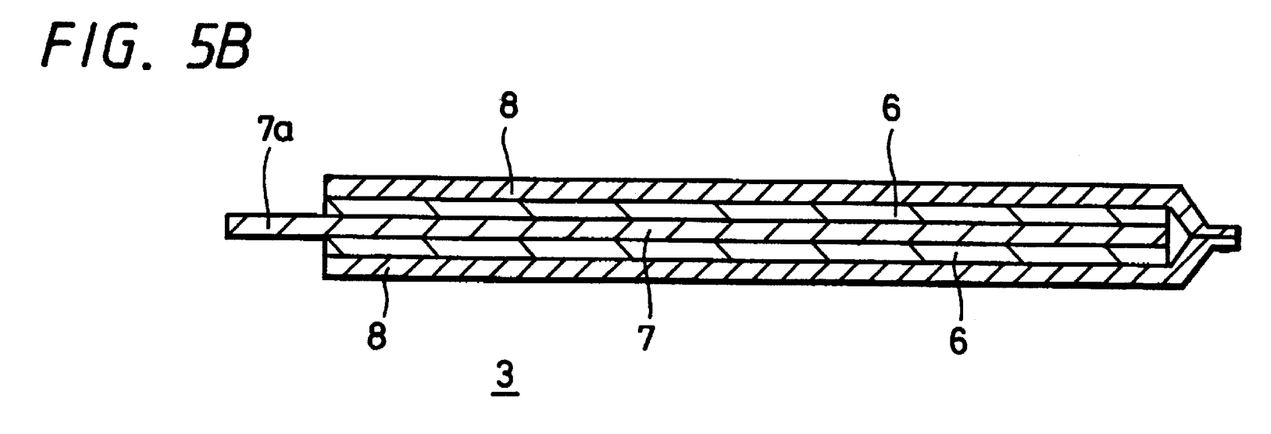

In the fourth embodiment, as shown in FIG. 5B, the negative electrode 3 is inserted into a bag-like separator formed by bonding two polypropylene microporous film separators 8 to each other, similarly to the first embodiment.

Figure 6:
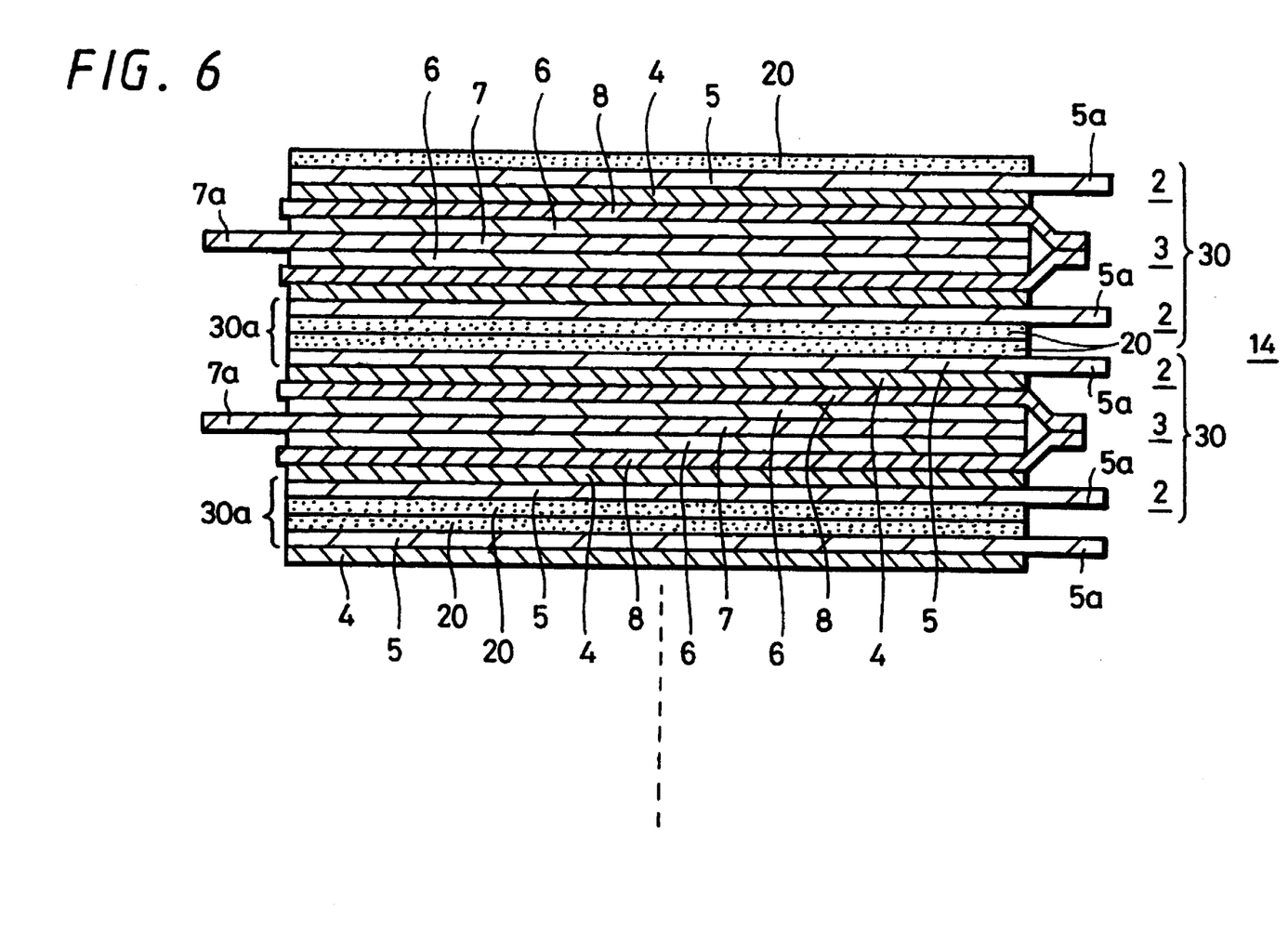
FIG. 6 is a cross-sectional view showing an arrangement of an electrode unit used in the lithium ion secondary battery according to the present invention.

As shown in FIG. 6, the sixty positive electrodes 2 each having the heat-resistant and heat-insulating film 20 on the one surface thereof and the thirty negative electrode 3 each inserted into the bag-like separator 8 were laminated such that the negative electrode 3 was disposed between the two positive electrodes 2 with being in contact with the positive-electrode mixtures 4 deposited on both of the positive electrodes 2 as shown in FIG. 6 and that edge portions 5a, where the positive-electrode mixture 4 was not deposited, of the positive-electrode collectors 5 were disposed on the same side and that edge portions 7a, where the negative-electrode mixture 6 was not deposited, of the negative-electrode collectors 7 were disposed on the same side. Thus, a laminated body 14 was formed.

In this case, as shown in FIG. 6, an electrode unit 30 is formed by successively laminating the positive electrode 2, the negative electrode 3 inserted into the bag-shaped separator 8 and the positive electrode 2 as shown in FIG. 6. An interface 30a is formed between the electrode units 30. At the interface 30a, the positive electrodes 2 of different electrode units are in contact with each other, which prevents the negative electrode 3 from opposing to any positive electrode 2 of other electrode unit 30. Moreover, heat-resistant and heat-insulating films 20 of the positive electrodes 2 of different electrode units 30 are disposed at the interface 30a.

Similarly to the first embodiment described with reference to FIGS. 2 and 3, the laminated body 14 of this example was inserted into the flat, rectangular battery case 10, and the flat, rectangular battery case 10 was closed by a lid plate 10a. An organic electrolysis solution was poured thereinto through an electrolysis inlet 13 and then the electrolysis inlet 13 was sealed tightly to obtain the fourth embodiment of the lithium ion secondary battery of the present invention.

When the fourth embodiment of the lithium ion secondary battery was charged and discharged, the result showed a discharge capacity of 35 Ah and satisfactory charge and discharge characteristics.

After being fully charged by a charge voltage of 4.2 V, the lithium ion secondary battery according to the fourth embodiment was subjected to the nail piercing test. Study of results of the test shown in the following Table 2 reveal that gas hardly gushed from the battery, a reduced rate of the electrolysis solution, i.e., a weight reduced rate thereof was small (i.e., 28%), and hence safety with respect to the internal short circuit was improved.

TABLE 2

|  | shape | heat-resistant and heat-insulating material (spray material) | weight reduced rate (%) |
| --- | --- | --- | --- |
| fourth embodiment | rectangular | alumina (on one surface of positive-electrode collector) | 28 |
| fifth embodiment | rectangular | alumina zirconia (on both surfaces of negative-electrode mixtures) and alumina (on one surface of positive-electrode collector) | 18 |
| sixth embodiment | cylindrical | alumina (on one surface of positive-electrode collector) | 21 |
| comparative example 3 | rectangular | none | 110 |
| comparative example 4 | cylindrical | none | 115 |

1) In each of the fourth to sixth embodiments and the comparative examples 3 and 4 of the lithium ion secondary batteries, the positive-electrode mixture is coated on only one surface of the positive-electrode collector 5, and the negative-electrode mixture is coated on both of the surfaces of the negative-electrode collector 7.

Specifically, according to the fourth embodiment, even if the battery is internally short-circuited, since the interface 30a is provided between the electrode units 30 where the positive electrode 2 and the negative electrode 3 are not opposed to each other and the heat-resistant and heat-insulating film 20 is provided on the interface 30, the generated short circuit can be prevented from spreading to adjacent electrode units 30, and damage of the battery itself can be suppressed and an influence of the internal short circuit extended to the surroundings can be suppressed to a minimum.

Figure 7:
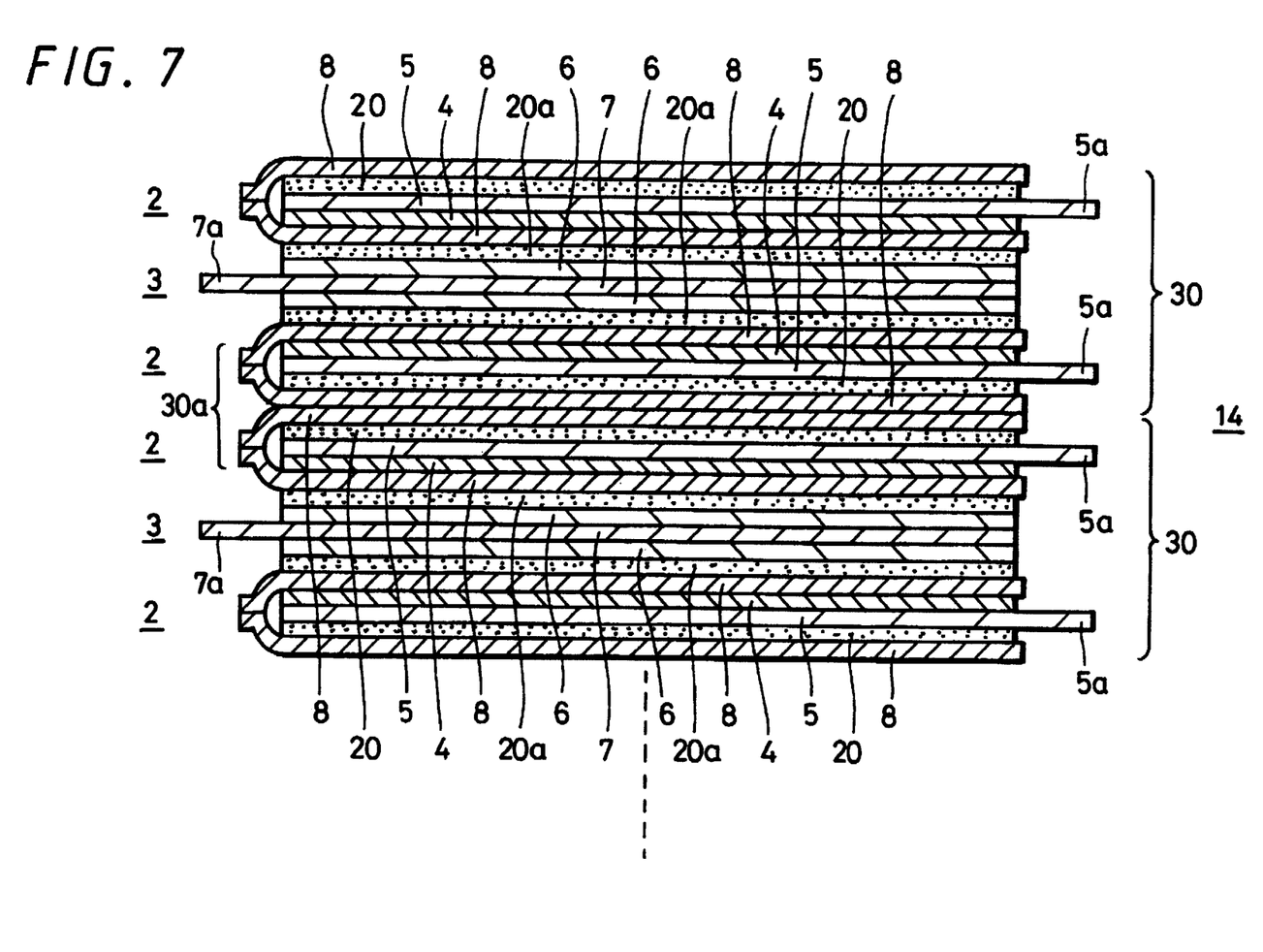
FIG. 7 is a cross-sectional view showing another arrangement of the electrode unit used in the lithium ion secondary battery according to the present invention.

A fifth embodiment of the lithium ion secondary battery shown in Table 2 will be described. In the fifth embodiment shown in Table 2, the negative electrode 3 was formed similarly to that of the fourth embodiment, except that ceramic powders of alumina zirconia ($Al_2O_3$-$ZrO_2$) having a mean particle size of 18 μm were sprayed by plasma spraying on both of surfaces of the negative electrode 3 to form the sprayed films, i.e., heat-resistant and heat-insulating films 20a on both of the negative mixtures 6 of the negative electrode 3 as shown in FIG. 7.

The heat-resistant and heat-insulating film 20a has a combined structure of the sprayed particles which is similar to a structure of a porous sintered body having combined pores (its porosity ranged from about 10 to 20%). The heat-resistant and heat-insulating film 20a has an ion permeability.

The heat-resistant and heat-insulating film 20 has a combined structure of the sprayed particles which is similar to a structure of a porous sintered body having combined pores. When the heat-resistant and heat-insulating film 20 has a thickness of about 30 μm, its porosity ranges from 10 to 20%.

In the fifth embodiment, the positive electrode 2 was formed similarly to that of the fourth embodiment. The positive electrode 2 having the sprayed film, i.e., heat-resistant and heat-insulating film 20 formed on the surface of the positive-electrode collector 5 where the positive-electrode mixture 4 was not deposited was inserted into a bag-like separator formed by bonding the polypropylene porous film separators 8 to each other.

The thirty negative electrodes 3 each having the heat-resistant and heat-insulating films 20a formed on both of the surfaces thereof and the sixty positive electrodes 2 each inserted into the bag-like separator 8 were successively laminated such that the negative electrode 3 was sandwiched between the two positive electrodes 2 with being opposed to the surfaces of the latter where the positive-electrode mixtures 4 were deposited. Thus, a laminated body 14 was formed. The laminated body 14 was arranged similarly to that of the fourth embodiment in other points.

In this case, as shown in FIG. 7, an electrode unit 30 is formed by sandwiching the negative electrode 3 between the two positive electrodes 2 each inserted into the bag-like separator 8. An interface 30a is formed between the electrode units 30. At the interface 30a, the positive electrodes 2 of different electrode units 30 are in contact with each other, which prevents the negative electrode 3 from opposing to any positive electrode 2 of other electrode unit 30. Moreover, the heat-resistant and heat-insulating films 20 of the positive electrodes 2 of different electrode units 30 are located at the interface 30a, and the heat-resistant and heat-insulating film 20a is located between the positive electrode 2 and the negative electrode 3.

When the lithium ion secondary battery according to the fifth embodiment was charged and discharged, the result showed a discharge capacity of 35 Ah and satisfactory charge and discharge characteristics.

Since each of the heat-resistant and heat-insulating films 20, 20a formed by spraying according to the fifth embodiment has micropores, the lithium ion can be moved through the micropores, which maintains the normal charge and discharge functions of the lithium ion secondary battery.

After being fully charged by a charge voltage of 4.2 V, the lithium ion secondary battery according to the fifth embodiment was subjected to the nail piercing test. Study of results of the test shown in the above Table 2 reveal that gas hardly gushed from the battery, a reduced amount of the electrolysis solution, i.e., a weight reduced rate thereof was small (i.e., 18%), and hence safety with respect to the short circuit was improved. Since the heat-resistant and heat-insulating film 20a is provided between the positive electrode 2 and the negative electrode 3, the arrangement of the fifth embodiment prevents the internal short circuit from being extended to other portions, more effectively as compared with that of the fourth embodiment.

Accordingly, it can easily be understood that the same effects as those of the fourth embodiment can be achieved in the fifth embodiment.

A sixth embodiment of the present invention is a cylindrical large-capacity lithium ion secondary battery similar to that shown in FIG. 4. In the sixth embodiment, a stripe negative electrode 3 (having a size of 283 mm×1750 mm) having the negative-electrode mixtures 6 coated on both surfaces of the negative-electrode collector 7 similarly to that of the fourth embodiment was manufactured, and a stripe positive electrode 2 (having a size of 280 mm×1745 mm) having the positive-electrode mixture 4 coated on only one surface of the positive-electrode collector 5 similarly to that of the fourth embodiment was manufactured as shown in FIG. 8.

One end of a negative-electrode lead 21 made of nickel was welded by resistance welding to a lead portion provided on one side of the negative electrode 3. One end of a positive-electrode lead 22 made of aluminum was welded by resistance welding to a lead portion provided on the other side of the positive electrode 2 (see FIG. 4).

Figure 8:
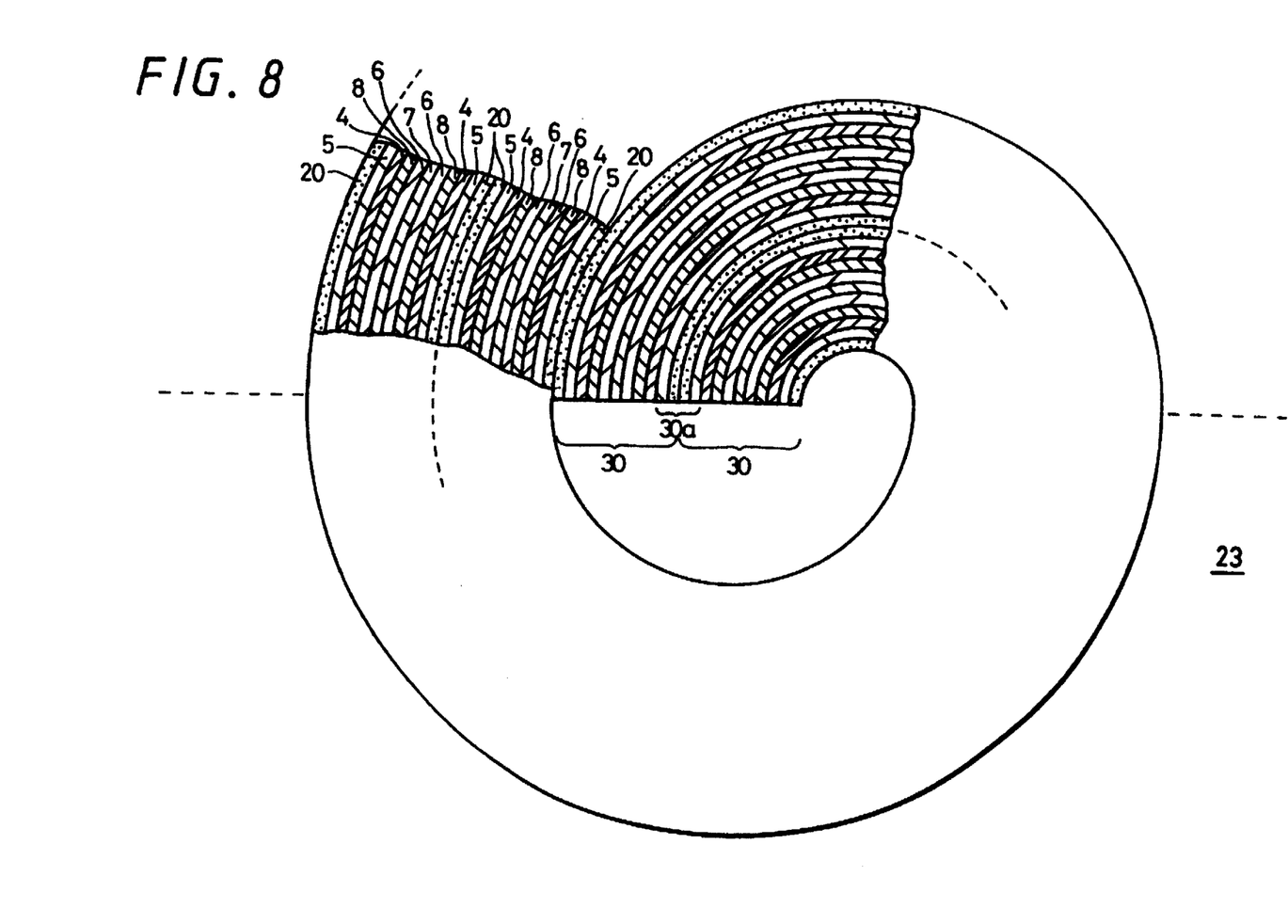
FIG. 8 is a cross-sectional view showing further another arrangement of the electrode unit used in the lithium ion secondary battery according to the present invention.

A sprayed film, i.e., a heat-resistant and heat-insulating film 20 having a thickness of 30 μm is formed by plasma-spraying a ceramic powder of alumina ($Al_2O_3$) having a mean particle size of 18 μm on one surface, where the positive-electrode mixture 4 was not deposited, of the positive-electrode collector 5 as shown in FIG. 8.

In the sixth embodiment, as shown in FIG. 8, the positive electrode 2, a polypropylene porous film separator 8 having a thickness of 25 μm and a size of 287 mm×1755 mm, the negative electrode 3, the separator 8 and the positive electrode 2 are successively laminated to form an electrode unit 30 and then a plurality of the electrode units 30 (e.g., the two electrode units 30 in FIG. 8) were spirally wound plural times to form a spirally laminated body 23.

In this case, the spirally laminated body 23 is arranged such that an alumina heat-resistant and heat-insulating film portion with a thickness of 60 μm formed of the two heat-resistant and heat-insulating films 20 of two different positive electrodes 2 is provided at an interface 30a where the positive electrodes 2 of different electrode units 30 are in contact with to each other.

Similarly to the third embodiment, as shown in FIG. 4, the spirally laminated body 23 was inserted into a cylindrical battery case 24 and then an organic electrolysis solution was poured into the cylindrical battery case 24. Thus, the lithium ion secondary battery according to the sixth embodiment was manufactured.

When the cylindrical lithium ion secondary battery according to the sixth embodiment was charged and discharged, the result showed a discharge capacity of 20 Ah and satisfactory charge and discharge characteristics.

After being fully charged by a charge voltage of 4.2 V, the lithium ion secondary battery according to the sixth embodiment was subjected to the nail piercing test. Study of results of the test shown in the above Table 2 reveal that gas hardly gushed from the battery, a reduced amount of the electrolysis solution, i.e., a weight reduced rate thereof was small (i.e., 21%), and hence safety with respect to the short circuit was improved.

Accordingly, it can easily be understood that the same effects as those of the fourth embodiment can be achieved in the sixth embodiment.

A lithium ion secondary battery according to a comparative example 3 is arranged similarly to the lithium ion secondary battery according to the fourth embodiment, except that the lithium ion secondary battery according to the comparative example 3 does not have a sprayed film, i.e., a heat-resistant and heat-insulating film 20 formed on either of surfaces of a positive electrode 2. The lithium ion secondary battery according to the comparative example 3 had a discharge capacity of 35 Ah.

After being fully charged by a charge voltage of 4.2 V, the lithium ion secondary battery according to the comparative example 3 was subjected to the nail piercing test. Study of results of the test shown in the above Table 2 reveal that a large amount of gas gushed from the battery and that a reduced amount of the electrolysis solution, i.e., a weight reduced rate thereof was large (i.e., 110%).

A lithium ion secondary battery according to a comparative example 4 is arranged similarly to the lithium ion secondary battery according to the sixth embodiment, except that the lithium ion secondary battery according to the comparative example 4 does not have a sprayed film, i.e., the heat-resistant and heat-insulating film 20 formed on either of surfaces of a stripe positive electrode 2. The lithium ion secondary battery according to the comparative example 4 had a discharge capacity of 20 Ah.

After being fully charged by a charge voltage of 4.2 V, the lithium ion secondary battery according to the comparative example 4 was subjected to the nail piercing test. Study of results of the test shown in the above Table 2 reveal that a large amount of gas gushed from the battery and that a reduced amount of the electrolysis solution, i.e., a weight reduced rate thereof was large (i.e., 115%).

While in the fourth to sixth embodiments alumina and/or alumina zirconia are employed as the spray materials, other materials such as metal oxide, metal carbonate, metal nitride or the like may be employed.

While in the fourth to sixth embodiments the interface 30a is provided at every electrode unit and the heat-resistant and heat-insulating film 20 is provided at the interface 30a, it can easily be understood that even if the interface 30a is provided at every few electrode units 30 and the heat-resistant and heat-insulating film 20 is provided at the interface 30a, the same effects as those of the second embodiment can be achieved.

According to the lithium ion secondary batteries of the fourth to sixth embodiments, since the interface 30a where the positive electrode 2 and the negative electrode 3 are not opposed to each other is provided at every one or few electrode units 30 and the heat-resistant and heat-insulating film 20 formed by spraying some suitable materials such as metal oxide, metal nitride or the like is provided at the interface 30a, even if the battery is internally short-circuited at a certain electrode unit, then it is possible to prevent the internal short circuit from being extended to adjacent electrode units, and to suppress damage of the battery itself and influence of the internal short circuit on the surroundings to a minimum.

According to the lithium ion secondary battery of the fifth embodiment, since the heat-resistant and heat-insulating films 20a are provided between the positive electrodes 2 and the negative electrode 3 of the same electrode unit 30, it is possible to reliably keep the electrical insulation between the positive and negative electrodes 2 and 3, to prevent the direct short circuit between the positive and negative electrodes 2 and 3, and to suppress a large amount of heat generated by an enlarged scale of the short circuit and a large amount of gushing gas caused thereby.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A lithium ion secondary battery comprising:
   a positive electrode comprising lithium ion generating substance;
   a negative electrode;
   a separator; and
   a heat-resistant and heat-insulating film having pores and formed on at least one of surfaces opposed to each other of said positive and negative electrodes, wherein said heat-resistant and heat-insulating film contains at least one material selected from the group consisting of metal oxide, metal carbonate and metal nitride, wherein said positive electrode and said negative electrode are laminated through said separator.

2. A lithium ion secondary battery according to claim 1, wherein said heat-resistant and heat-insulating film contains alumina, zirconia, alumina zirconia or magnesium zirconate.

3. A method of manufacturing a lithium ion secondary battery, comprising the steps of:
   forming a positive electrode comprising lithium ion generating substance;
   forming a negative electrode;
   forming a heat-resistant and heat-insulating film having pores and formed on at least one of surfaces opposed to each other of said positive and negative electrodes, wherein said heat-resistant and heat-insulating film is formed by spraying powders made of at least one material selected from the group consisting of metal oxide, metal carbonate and metal nitride; and
   laminating said positive and negative electrodes through a separator.

4. A method of manufacturing a lithium ion secondary battery according to claim 3, wherein said spraying is plasma spraying.

5. A lithium ion secondary battery comprising:
   a positive electrode comprising lithium ion generating substance;
   a negative electrode;
   a separator; and
   a heat-resistant and heat-insulating film formed on at least one of surfaces, which are not opposed to each other, of said positive and negative electrodes, wherein said positive electrode and said negative electrode are laminated through said separator, wherein said heat-resistant and heat-insulating film contains at least one material selected from the group consisting of metal oxide, metal carbonate or metal nitride.

6. A lithium ion secondary battery according to claim 5, wherein said heat-resistant and heat-insulating film contains alumina, zirconia, alumina zirconia or magnesium zirconate.

7. A lithium ion secondary battery according to claim 5, wherein said heat-resistant, and heat-insulating film is not formed on either of surfaces opposed to each other of said positive and negative electrodes.

8. A lithium ion secondary battery according to claim 5, wherein a second heat-resistant and heat-insulating film is formed on at least one of surfaces opposed to each other of said positive and negative electrodes.

9. A method of manufacturing a lithium ion secondary battery, comprising the steps of:
   forming a positive electrode comprising lithium ion generating substance;
   forming a negative electrode;
   forming a heat-resistant and heat-insulating film having pores and formed on at least one of surfaces, which are not opposed to each other, of said positive and negative electrodes, wherein said heat-resistant and heat-insulating film is formed by spraying powders of metal oxide, metal carbonate or metal nitride; and laminating said positive and negative electrodes through a separator.

10. A method of manufacturing a lithium ion secondary battery according to claim 9, wherein said spraying is plasma spraying.

11. A method of manufacturing a lithium ion secondary battery according to claim 9, wherein a second heat-resistant and heat-insulating film is formed on at least one of surfaces opposed to each other of said positive and negative electrodes, by spaying powders of metal oxide, metal carbonate or metal nitride.

12. A lithium ion secondary battery comprising:
   a positive electrode comprising positive electrode collector comprising two opposing surfaces, at least one of which is coated with a positive electrode mixture comprising a lithium ion generating substance and the other of which is coated with a heat-resistant and heat-insulating film having pores, the heat-resistant and heat-insulating film comprising at least one material selected from the group consisting of metal oxide, metal carbonate and metal nitride,
   a negative electrode comprising a negative electrode collector comprising two opposing surfaces, both of which are coated with a negative electrode mixture,
   a separator disposed between the positive and negative electrodes and laminating the positive and negative electrodes together.

13. The battery of claim 12 wherein the separator is disposed between the negative electrode mixture and the positive electrode mixture.

14. The battery of claim 12 wherein the separator comprises a bag-like structure that envelopes the negative electrode.

15. The battery of claim 12 wherein the separator comprises a bag-like structure that envelopes the positive electrode.

16. The battery of claim 12 wherein the separator is disposed between the positive electrode mixture and the heat-resistant and heat-insulating film.

17. The battery of claim 12 wherein both surfaces of the positive electrode collector are coated with layers of the positive electrode mixture each layer of positive electrode mixture is coated with a layer of the heat-resistant and heat-insulating film.

18. A method of manufacturing a lithium ion secondary battery comprising the following steps:
   providing a positive electrode collector comprising two opposing surfaces,
   coating at least one the positive electrode collector surfaces with a positive electrode mixture comprising a lithium ion generating substance,
   coating the other of the positive electrode collector surfaces with a heat-resistant and heat-insulating film having pores, the heat-resistant and heat-insulating film comprising at least one material selected from the group consisting of metal oxide, metal carbonate and metal nitride,
   providing a negative electrode collector comprising two opposing surfaces,
   coating both surfaces of the negative electrode collector with a negative electrode mixture,
   laminating the positive and negative electrodes together with a separator.

19. The method of claim 18 wherein the separator is disposed between the negative electrode mixture and the positive electrode mixture.

20. The method of claim 18 wherein the separator comprises a bag-like structure the envelopes the negative electrode.

21. The method of claim 18 wherein the separator comprises a bag-like structure the envelopes the positive electrode.

22. The method of claim 18 wherein the separator is disposed between the positive electrode mixture and the heat-resistant and heat-insulating film.

23. The method of claim 18 wherein both surfaces of the positive electrode are coated with the positive electrode mixture and with the heat-resistant and heat-insulating film on top of the positive electrode mixture.

* * * * *